3,577,535
TREATMENT OF THYROID HORMONE IMPAIRMENT PHARMACEUTICAL COMPOSITIONS CONTAINING 3,5,3' - L-TRIIODOTHYRONINE COMPLEXES
Harold C. Reynolds, Kankakee, and Donald B. Olsen, Bonfield, Ill., assignors to Armour Pharmaceutical Company, Chicago, Ill.
No Drawing. Original application June 29, 1966, Ser. No. 561,357, now Patent No. 3,477,954. Divided and this application Jan. 27, 1969, Ser. No. 794,408
Int. Cl. A61k *27/00*
U.S. Cl. 424—198                                3 Claims

ABSTRACT OF THE DISCLOSURE

A pharmaceutical composition consisting of a pharmaceutically acceptable carrier and the reaction product formed by reacting less than a stoichiometric amount of a tertiary phosphine with thyroxine (free acid) in a dipolar aprotic solvent. The composition contains thyroxine (free acid) and 3,5,3'-L-triiodothyronine in a preselected ratio to each other and is useful for the treatment and control of body disorders associated with an impairment of the thyroid hormone function.

---

This application is a divisional application from our co-pending United States patent application Ser. No. 561,357, filed June 29, 1966, now U.S. Pat. No. 3,477,954, and is filed pursuant to a final requirement for restriction of inventions entered therein.

The present invention relates generally to pharmaceutical compositions containing a pharmacologically active form of triiodothyronine, namely, 3,5,3'-L-triiodothyronine, which are useful as calorigenic agents in the treatment and control of body disorders associated with an impairment of the thyroid hormone function. More particularly, the invention relates to compositions containing 3,5,3'-L-triiodothyronine and thyroxine which are useful therapeutic agents for treating thyroid-deficient animals, especially man.

It is well-known that the great utility of desiccated thyroid, which has been marketed at least since 1913, is brought about by the presence therein of iodinated thyronines, especially 3,5,3'-L-triiodothyronine. Furthermore, desiccated thyroid has for years been a medical standby for the treatment of human body disorders associated with the impairment of thyroid hormone function and until very recently the animal glands from which it is prepared have been in economical and plentiful supply. Now, however, the demand for natural thyroid is inordinately disproportionate to the supply of fresh glands available and it has become imperative that the pharmaceutical industry discover how to obtain the effect of desiccated thyroid by the administration of synthetic products.

Pitt-Rivers and Gross were among the first to attempt to synthesize thyroid substitutes and they have published several articles on their work. One of their efforts is described in U.S. Pat. No. 2,823,164, Feb. 11, 1958, which also provides background for the problem. The method they disclose, viz, the iodination of 3,5-diiodothyronine (herein called "$T_2$") to produce 3,5,3'-L-triiodothyronine (herein called "$T_3$"), suffers from the disadvantage that unless all of the $T_2$ is iodinated, a residuum of $T_2$ remains. $T_2$ has little or no therapeutic value in treating the thyroid deficient patient and therefore if permitted to remain with the $T_3$ of Pitt-Rivers and Gross, it exists as foreign matter.

One question in the field of thyroid therapy which is still debated involves the relative effect of the thyroxine (herein called $T_4$) and $T_3$ in desiccated thyroid upon the thyroid deficient patient. There are members of the medical profession who believe that a concentrated $T_3$ administration (free of all $T_4$), such as that advocated by Pitt-Rivers and Gross, is not able to duplicate the effect of administering desiccated thyroid although it is still warranted for use under special circumstances. Other doctors believe that the effect of desiccated thyroid is better obtained by the administration of a synthetic product which contains both $T_3$ and $T_4$ in the approximate proportions to each other exist in a natural thyroid product.

Thus, it is apparent that a need exists for a method of preparing $T_3$ which avoids residual $T_2$ and which, if possible, also permits the production of a synthetic thyroid product which, when desired, can contain both $T_3$ and $T_4$ in preselected ratios, preferably duplicating the measured ratio of these agents in natural thyroid products. A mixture containing about one part $T_3$ to about four parts $T_4$ is believed to simulate the metabolic effects of normal thyroid secretion.

The present invention is based upon our discovery of a new and useful method for preparing 3,5,3'-L-triiodothyronine which not only provides 3,5,3'-L-triiodothyronine of excellent quality by the selective deiodination of thyroxine, but which also can be controlled to provide a preselected amount of unreacted thyroxine ($T_4$) in the final product so as to substantially duplicate the $T_3$:$T_4$ ratio of desiccated thyroid and thereby produce our product of choice. Further, we have found that such effect can be obtained within $T_4$:$T_3$ ratios of from about 3.5:1 to about 8:1.

Accordingly, a principal object of the present invention is to provide a method of producing a pharmacologically active iodinated thyronine, namely, 3,5,3'-L-triiodothyronine, which may contain preselected and controlled amounts of thyroxine and which has great clinical utility as a replacement for desiccated thyroid in the prevention or treatment of goiter, both nodular and non-nodular, and which is of particular utility for the treatment of disorders associated with thyroid deficiencies, cretinism, myxedema as well as a variety of clinical conditions associated with subclinical hypothyroidism.

Still another object of the present invention is to provide a method for producing substantially pure 3,5,3'-L-triiodothyronine from a phosphonium iodide complex of thyroxine.

A further object of the present invention is to provide a process for producing products containing relative proportions of synthetic active components to substantially simulate the ratios of the corresponding natural components as they occur in normal thyroid secretions or in natural desiccated thyroid; which products simulate substantially all of metabolic characteristics of normal thyroid secretion or of natural desiccated thyroid; and which process achieves, inter alia, the preparation in situ of such properly proportioned products.

These, and still further objects as shall hereinafter appear, are readily fulfilled in a remarkably unexpected fashion by our invention as will be readily discerned from the following detailed description of embodiments which are exemplary thereof.

As used herein, the terms "3,5,3'-L-triiodothyronine" and "T$_3$" are used interchangeably to define that iodinated thyronine compound having the structure

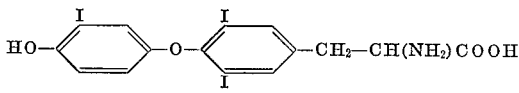

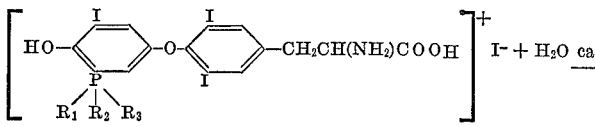

the terms "thyroxine" and "T$_4$" are used interchangeably to define that iodinated thyronine compound having the structure

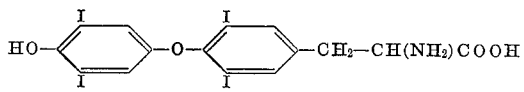

In the practice of the present invention, we find that thyroxine or the sodium salt of thyroxine provide the most commercially practicable starting material for our process. When we start with the sodium salt of thyroxine, we convert the salt to thyroxine such as by reacting the salt with glacial acetic acid in the presence of water to form a slurry. Next, this slurry is filtered and the resulting filter cake is washed with water. This washed cake is then dried under vacuum at 80°–100° C. and is thyroxine (free acid).

Generally speaking, our process may be performed in two steps.

In the first step, thyroxine is reacted with a tertiary phosphine selected from the group consisting of trialkyl phosphine, tri (alkylaryl) phosphine and triaryl phosphine to form a phosphonium iodide complex of thyroxine. As will appear, the reaction which takes place in the presence of dimethyl formamide which is represenative of dipolar aprotic solvents.

In this step, phosphine can be represented by $(R_1R_2R_3)P$ wherein $R_1$ and $R_2$ and $R_3$ each may be either alkyl or aryl. Preferably, though not necessarily, $R_1$, $R_2$ and $R_3$ will be the same moiety as in tri-n-butylphosphine, tri-m-octylphosphine, tri-phenylphosphine and the like.

In practice, it has been found especially desirable to use an alkyl having one to four carbons, for example, methyl, ethyl, propyl, i-propyl, butyl. Our alkyl reagent of choice, by virtue of its relative low cost and availability is tri-butyl phosphine.

Tertiary phosphines containing aryls selected from the group comprising phenyl, substituted phenyl and methyl toluene are highly satisfactory. It does not appear to be significant what moiety is used as the substituent on the phenyl since this linkage remains intact throughout the process although moieties which are stable substituents on phenyl include chloro, bromo, fluoro, nitro, amino, methyl, methyoxy, and the like.

Our aryl reagent of choice is triphenyl phosphine.

Step one of our process may be shown by the following notation:

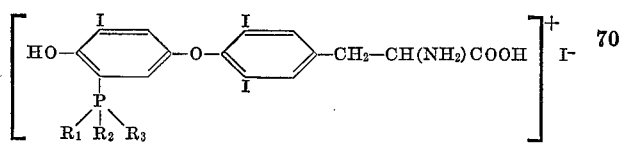

Phosphonium iodide complex.

In the next step, the phosphonium iodide complex, so produced is hydrolyzed with water, preferably in the presence of a suitable catalyst such as the hydroxides of alkali or alkaline earth metals, for instance, NaOH, Ca(OH)$_2$, KOH, and the like, to form a reaction product containing 3,5,3'-L-triiodothyronine, ionized hydrogen iodide, and a compound selected from the group consisting of trialkyl phosphine oxide, tri (arylalkyl) phosphine, and triaryl phosphine oxide, the alkyl or aryl identity being dependent upon the phosphine reagent selected for the first step.

This step is shown in the following notation:

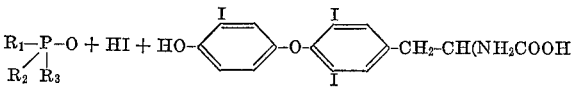

It is apparent that when the reagents utilized in step one are provided with a stoichiometric imbalance, that is, if stoichiometrically we provide more thyroxine than can be complexed by the quantity of phosphine introduced into the reaction, then the reaction product will contain a controllable amount of thyroxine, i.e., the stoichiometric excess, in addition to the complex as illustrated.

Thus, when the reaction product of step one, containing both thyroxine and complex, is hydrolyzed according to step two, the final product of step two will contain both T$_4$ and T$_3$ in whatever proportions are indicated by the amounts of the various ingredients employed.

To further aid in understanding the present invention, and not by way of limitation, attention is directed to the following examples.

EXAMPLE I 1.62 gm. (2.08 mmols) thyroxine (free acid) was dissolved in 100 ml. hot DMF. The solution was cooled to 25° whereupon a cloud formed. Stirring was continued overnight to a clear solution. 0.196 gm. (0.75 mmol) triphenyl phosphine was dissolved in 5 ml. DMF and added dropwise to the thyroxine solution. The mixture was heated to 50–55° and held at this temperature for 19 hours. 10 ml. water was added to the solution and the water and DMF were evaporated off under house-vacuum on the steam cone. A blanket of nitrogen gas was maintained over the evaporating solution. 50 ml. xylene was added to the flask and evaporated. The contents of the flask were dissolved in 25 ml. methyl alcohol. 10 ml. 1 N sodium hydroxide solution was added to the flask, and the slurry was refluxed 15 minutes. 100 ml. water was added to the flask. The methanol was evaporated off and the slurry was cooled to 25°. The slurry was extracted with 2× 100 ml. ethyl ether. The ether extract was discarded. The aqueous extract was adjusted to a pH of 8.6 with hydrochloric acid. The precipitate which formed was concentrated in a centrifuge. The supernatant was decanted and the cake reconstituted in 25 ml. saturated salt solution. The slurry was concentrated in a centrifuge and the supernatant was decanted. The cake was dried under high vacuum at 25° to 0.55 gm. Thin-layer chromatography of this product indicated a T$_4$/T$_3$ ratio of 2.3/1. The product contained 0.30 gm. (0.375 mmol) T$_4$, 0.13 gm. (0.19 mmol) T$_3$ and 0.12 gm. sodium chloride.

Analysis of this product indicated it contained 23.5% sodium chloride. The product had the following analysis: Calculated (T$_4$/T$_3$–2.3) (percent): C, 18.4; H, 1.09; I, 47.7. Found (percent): C, 18.54; H, 1.28; I, 47.7.

EXAMPLE II

The procedure of Example I was repeated with 1.62 gm. (2.08 mmols) of thyroxine and 1.6 gm. (0.57 mmol) triphenyl phosphine. About 0.45 gm. of product was formed having a T$_4$:T$_3$ ratio of 3.5:1.

EXAMPLE III

The procedure of Example I was repeated with 1.62 gms. (2.08 mmols) of thyroxine and 0.86 (0.31 mmol) of triphenyl phosphine. About 0.5 gm. of product was formed having a $T_4:T_3$ ratio of 8:1.

EXAMPLE IV

As is well known, the currently preferred form for marketing 3,5,3'-L-triiodothyronine and thyroxine for human therapeutical use is as their corresponding sodium salts. The conversion of pure $T_3$ and $T_4$ into the sodium salt is readily accomplished and is illustrated by this example.

8.4 gm. (13 mmols) of $T_3$, prepared according to the method of our copending application Ser. No. 561,357, is dissolved in 200 ml. boiling 2 N sodium carbonate. The clear solution is cooled to room temperature and further to 4° C. in a refrigerator. The solid which forms is collected in a low-speed centrifuge. The supernatant is discarded. The solid is sodium liothyronine (the sodium salt of 3,5,3'-L-triiodothyronine) and is stirred with 2 volumes of 3A denatured ethanol and centrifuged. The supernatant aqueous ethanol is discarded. The solid is then stirred with 2 volumes of dimethoxyethane and collected on a Buchner funnel. The final cake is dried at 100° C. at 29 inches vacuum to a constant weight and yields 6 gm. (8.9 mmols) sodium liothyronine.

In the foregoing examples, we have illustrated our tertiary phosphine with tributyl phosphine and triphenyl phosphine. Our experience with the reaction, however, leads us to believe that any tertiary phosphine will perform in the process. Thus, the only criteria in selecting the tertiary phosphine in its cost and availability. A list of tertiary phosphines which are considered suited for the practice of our process appears at pages 31–37 under the heading "3. Tertiary Phosphines" in the book by Gennady M. Kosolapoff entitled "Organophosphorus Compounds," Copyright 1950, John Wiley Sons, New York (Library of Congress, Call Number: QD142.P1.K84).

The following example represents an evaluation of various combinations of synthetic $T_4$ and $T_3$ which were formulated to simulate endogenously secreted thyroid hormones at the Harvard Medical School and reported by Drs. Wool and Selenkow in vol. 6, No. 6 of Clinical, Pharmacology and Therapeutics.

EXAMPLE V

Twenty-one patients with primary myxedema were treated on an out-patient basis. They were carefully selected to ensure clinical and laboratory athyreosis. Thyroid parameters in the untreated state included a mean PBI level of 1.3 mcg. percent (range 0.4 to 2.8 mcg. percent) and a mean serum cholesterol level of 377 mg. percent (range 191 to 522 mg. percent).

Each patient served as his own control and was treated with one of several combinations containing sodium L-thyroxine, 100–300 mcg. daily (97–291 mcg. L-thyroxine) and L-triiodothyronine, 0 to 50 mcg. daily. The combinations used in this evaluation were prepared by physically admixing various amounts of synthetic sodium L-thyroxine (Synthroid brand, Flint Laboratories, Morton Grove, Ill.) and synthetic L-triiodothyronine (Cytomel brand, Smith Kline & French Laboratories, Philadelphia, Pa.).

At the end of each treatment period, the patients were evaluated clinically and serum was obtained for determinations of PBI (normal range 3.5 to 8.0 mcg. percent), cholesterol (normal range 150–250 mcg. percent) and Resin-$T_3$ uptake (normal range 25–35 percent at 25° C.). Basal metabolic rate (BMR) determinations were performed in selected instances. Each combination was continued for a minimum of 6 weeks, but periods of 8 weeks or more were usually observed before changing dosages. The test samples of L-thyroxine and L-triiodothyronine were formulated to be calorigenically equivalent to 180 mg. of a potent porcine preparation of USP thyroid (desiccated thyroid, USP, Armour). In Athyreotic patients, the average daily replacement does of sodium L-thyroxine required to maintain clinical euthyroidism is approximately 300 to 400 mcg. and that of L-triiodothyronine is about 75 to 125 mcg. For simplicity, each combination is designated as the ratio of the microgram content of each synthetic hormone; e.g., 150/50 indicates 150 mcg. sodium L-thyroxine and 50 mcg. L-triiodothyronine.

While it is difficult to measure precisely what has been termed "clinical euthyroidism," patients in this study were considered clinically euthyroid on each combination of L-thyroxine and L-triiodothyronine if they evidenced no signs or symptoms of thyroid lack or excess. Cholesterol, Resin-$T_3$, and selected basal metabolic rates were used to substantiate the clinical appraisal of euthyroidism.

Similar regimens were administered to 6 patients with well-documented panhypopituitarism as well as to selected groups of patients with nontoxic goiter and with hyperthyroidism treated with antithyroid-thyroid therapy.

All patients were adjudged clinically and metabolically euthyroid on each combination of L-thyroxine and L-triiodothyronine studied. Mean values for critical parameters of thyroid function at each dosage level are listed in Table I.

TABLE I

| Synthetic combination $T_4/T_3$ (mcg.) | PBI, mean±s.d.[1] | Resin-$T_3$, mean±s.d.[1] | Cholesterol, mean±s.d.[1] |
|---|---|---|---|
| Myxedema: | | | |
| 150/25 | 4.3±0.4 (2) | 28.6±2.3 (2) | 204±17 (2) |
| 150/50 | 4.1±0.9 (15) | 30.8±2.3 (16) | 197±33 (16) |
| 200/25 | 6.0±1.3 (14) | 31.7±3.5 (10) | 186±36 (8) |
| 200/50 | 6.8±1.7 (22) | 32.3±2.3 (20) | 200±34 (21) |
| 300/25 | 8.9±1.2 (8) | 36.4±3.6 (4) | 191±37 (8) |
| Panhypopituitarism: | | | |
| 150/25 | 3.9±1.0 (2) | 28.6±3.3 (2) | 249±35 (2) |
| 150/50 | 4.5±0.9 (5) | 27.7±3.7 (5) | 182±43 (5) |
| 200/25 | 73.±0.8 (3) | 34.6±3.6 (2) | 177±14 (2) |
| 200/50 | 5.6±2.0 (6) | 31.4±2.6 (5) | 175±37 (4) |
| Thyroid insufficiency:[2] | | | |
| 150/25 | 4.1±0.7 (4) | 28.6±2.5 (4) | 227±26 (4) |
| 150/50 | 4.2±0.9 (20) | 30.1±2.6 (21) | 193±34 (21) |
| 200/25 | 6.2±1.2 (17) | 32.2±3.5 (12) | 184±30 (10) |
| 200/50 | 6.5±1.8 (28) | 32.1±2.4 (25) | 196±35 (25) |
| 300/25 | 8.9±1.2 (8) | 36.4±3.6 (4) | 191±37 (8) |

[1] Numbers in parenthesis following the standard deviation of the mean represent the number of observations.
[2] Combined data (hypothyrodism and panhypopituitarism).

Based upon this data, the daily oral combination of synthetic hormones which will maintain an athyreotic patient in cylinical euthyroidism and at the same time give levels of serum PBI, cholesterol, and Resin-$T_3$ uptake in the useful range of normal contains approximately 175 to 200 mcg. L-thyroxine and 25 to 50 mcg. L-triiodothyronine, that is, in ratios of $T_4:T_3$ of from about 3.5:1 to about 8:1.

We know of no reason to suspect that a product prepared by this invention to have the $T_4:T_3$ ratios reported would react any less efficaciously than the physical mixture created and used at Harvard.

From the foregoing, it becomes apparent that a unique pharmaceutical preparation consisting of a pharmaceutically acceptable carrier and the reaction product formed by reacting less than a stoichiometric amount of a tertiary phosphine with thyroxine (free acid) in a dipolar aprotic solvent has been herein described and illustrated from which it can be discerned that all of the aforestated objectives are fulfilled in a remarkably unexpected fashion.

What is claimed is:

1. The method of treating and controlling body disorders associated with an impairment of the thyroid hormone function in animal, especially man, comprising orally administering to said animal a therapeutically sufficient amount of the product obtained by reacting a tertiary phosphine with thyroxine (free acid) in a dipolar aprotic solvent to form a phosphonium iodide complex and thereafter hydrolyzing said complex to form said product, said product containing thyroxine (free acid)

and 3,5,3'-L-triiodothyronine in a ratio of one another of from about 3.5:1 to about 8:1.

2. The method of claim 1 wherein said tertiary phosphine has the formula $R_1R_2R_3P$ wherein $R_1$, $R_2$ and $R_3$ are the same or different moities and are selected from alkyl or aryl.

3. The method of claim 2 wherein said tertiary phosphine is tri-n-butylphosphine, tri-n-octylphosphine or triphenylphosphine.

References Cited

UNITED STATES PATENTS 3,374,269  3/1968  Langer _____ 260—519

STANLEY J. FRIEDMAN, Primary Examiner

U.S. Cl. X.R.

424—317